(12) United States Patent
Mastrocola et al.

(10) Patent No.: US 10,800,386 B2
(45) Date of Patent: *Oct. 13, 2020

(54) BRAKE POSITION SYSTEM

(71) Applicant: GOODRICH CORPORATION, Charlotte, NC (US)

(72) Inventors: Naison Mastrocola, Goshen, CT (US); Michael Abbott, Shelburne, VT (US)

(73) Assignee: GOODRICH CORPORATION, Charlotte, NC (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/658,184

(22) Filed: Jul. 24, 2017

(65) Prior Publication Data

US 2019/0023244 A1 Jan. 24, 2019

(51) Int. Cl.
*B60T 8/17* (2006.01)
*F16D 65/18* (2006.01)
(Continued)

(52) U.S. Cl.
CPC ............ *B60T 8/1703* (2013.01); *B60T 8/171* (2013.01); *B60T 8/172* (2013.01); *B60T 13/741* (2013.01); *B64C 25/44* (2013.01); *F16D 55/226* (2013.01); *F16D 55/24* (2013.01); *F16D 65/183* (2013.01); *F16D 65/186* (2013.01); *F16D 66/00* (2013.01);
(Continued)

(58) Field of Classification Search
CPC ........ B60T 8/1703; B60T 8/172; B60T 8/171; B64C 25/44; F16D 66/00; F16D 65/186; F16D 2125/40; F16D 2066/003
See application file for complete search history.

(56) References Cited

U.S. PATENT DOCUMENTS 5,522,259 A 6/1996 Schmidt et al.
5,848,672 A 12/1998 Brearly
(Continued)

FOREIGN PATENT DOCUMENTS

DE 102012006105 9/2013
EP 1793477 6/2007
(Continued)

OTHER PUBLICATIONS

Communication Pursuant to Article 94(3) EPC dated Dec. 22, 2017 in European Application No. 16165751.5.
(Continued)

*Primary Examiner* — Xuan Lan Nguyen
(74) *Attorney, Agent, or Firm* — Snell & Wilmer L.L.P.

(57) ABSTRACT

A brake actuator system may comprise a brake actuator comprising a ball screw, a ball nut coupled to the ball screw, and a ram coupled to a ram end of the ball nut; a position sensor coupled to the brake actuator; a processor in electronic communication with the brake actuator and the position sensor; and a tangible, non-transitory memory configured to communicate with the processor, the tangible, non-transitory memory having instructions stored thereon that, in response to execution by the processor, cause the processor to perform operations. The operations may comprise commanding the brake actuator to translate the ball nut in a first direction toward a brake stack; detecting the pusher reaching a furthest forward position; and commanding the brake actuator to translate the ball nut in a second direction opposite the first direction for a predetermined retraction distance.

11 Claims, 5 Drawing Sheets

(51) Int. Cl.
  *F16D 66/00*    (2006.01)
  *B60T 8/171*    (2006.01)
  *B60T 8/172*    (2006.01)
  *B64C 25/44*    (2006.01)
  *F16D 55/24*    (2006.01)
  *F16D 55/226*   (2006.01)
  *B60T 13/74*    (2006.01)
  *F16D 125/40*   (2012.01)
  *F16D 125/36*   (2012.01)

(52) U.S. Cl.
  CPC .... *F16D 2066/003* (2013.01); *F16D 2125/36* (2013.01); *F16D 2125/40* (2013.01)

(56) References Cited

U.S. PATENT DOCUMENTS

| | | |
|---|---|---|
| 6,003,640 A | 12/1999 | Ralea |
| 6,095,293 A | 8/2000 | Brundrett |
| 6,279,694 B1 | 8/2001 | Bohm |
| 6,462,497 B1 | 10/2002 | Rinsma |
| 6,471,015 B1 | 10/2002 | Ralea |
| 6,536,562 B1 | 3/2003 | Bohm |
| 6,702,069 B2 | 3/2004 | Ralea |
| 7,108,107 B2 | 9/2006 | Ralea |
| 7,129,658 B2 | 10/2006 | Ether |
| 7,673,721 B2 | 3/2010 | Bailey |
| 7,847,679 B2 | 12/2010 | Copeland |
| 8,230,983 B2 | 7/2012 | Bailey |
| 9,610,927 B2 | 4/2017 | Ayichew |
| 9,663,078 B1 | 5/2017 | Rook |
| 2005/0258681 A1 | 11/2005 | Fulks |
| 2005/0269872 A1 | 12/2005 | Ralea |
| 2007/0235267 A1 | 10/2007 | Liebert |
| 2008/0092641 A1 | 4/2008 | Cahill |
| 2008/0283346 A1 | 11/2008 | Ralea |
| 2009/0205910 A1 | 8/2009 | Cahill |
| 2010/0286881 A1 | 11/2010 | Cahill |
| 2012/0221184 A1 | 8/2012 | Pfohl |
| 2015/0330470 A1 | 11/2015 | Siebke |
| 2016/0041058 A1 | 2/2016 | Georin |
| 2016/0076609 A1 | 3/2016 | Narula |
| 2016/0339881 A1 | 11/2016 | Abbott et al. |

FOREIGN PATENT DOCUMENTS

| | | |
|---|---|---|
| GB | 2457376 | 8/2009 |
| WO | 9850711 | 11/1998 |

OTHER PUBLICATIONS

Rehfus, U.S. Appl. No. 14/689,816, filed Apr. 17, 2015 and entitled Brake Postiion and Wear Detesction Systems and Methods.
Restriction Requirement dated Jun. 21, 2016 in U.S. Appl. No. 14/689,816.
Extended European Search Report dated Aug. 29, 2016 in European Application No. 16165751.5.
Preinterview First Office Action dated Sep. 28, 2016 in U.S. Appl. No. 14/689,816.
First Action Interview Office Action dated Feb. 14, 2017 in U.S. Appl. No. 14/689,816.
Final Office Action dated May 10, 2017 in U.S. Appl. No. 14/689,816.
Mastrocola, U.S. Appl. No. 15/658,067, filed Jul. 24, 2017 and entitled Brake Position System.
Advisory Action dated Aug. 9, 2017 in U.S. Appl. No. 14/689,816.
USPTO, Advisory Action dated Jun. 18, 2018 in U.S. Appl. No. 14/689,816.
USPTO, Final Office Action dated Feb. 28, 2019 in U.S. Appl. No. 14/689,816.
USPTO, Final Office Action dated May 8, 2018 in U.S. Appl. No. 14/689,816.
Non-Final Office Action dated Sep. 20, 2017 in U.S. Appl. No. 14/689,816.
USPTO, Non-Final Office Action dated Sep. 18, 2018 in U.S. Appl. No. 14/689,816.
USPTO, Advisory Action dated Apr. 30, 2019 in U.S. Appl. No. 14/689,816.
USPTO, Non-Final Office Action dated Jul. 25, 2019 in U.S. Appl. No. 14/689,816.
USPTO, Pre-Interview First Office Action dated Jul. 15, 2019 in U.S. Appl. No. 15/658,067.
USPTO, Notice of Allowance dated Sep. 16, 2019 in U.S. Appl. No. 15/358,067.
USPTO, Notice of Allowance dated Oct. 17, 2019 in U.S. Appl. No. 14/689,816.
USPTO, Corrected Notice of Allowance dated Jan. 10, 2020 in U.S. Appl. No. 14/689,816.

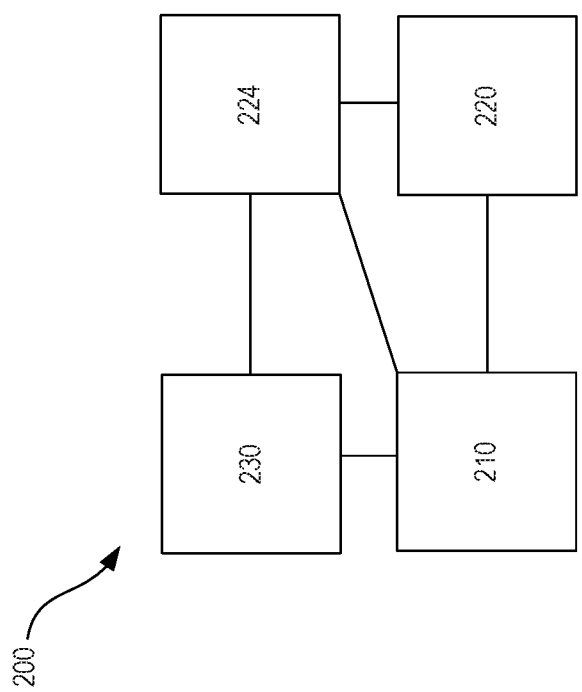

BRAKE POSITION SYSTEM

FIELD

The present disclosure relates to aircraft brake systems and methods, and more particularly, to systems and methods for detection of brake disc position.

BACKGROUND

Vehicle wheel assemblies (e.g., in aircraft, automobiles, or the like) may comprise brake stacks which stop the vehicle in response to the compression of rotating and stationary brake discs by either hydraulic or electromechanical actuators. To engage the brakes, a ball nut may translate a ram to contact the brake discs to cause the compression of the brake discs. When not engaged, the ram may rest in a position that is resting on or near an adjacent brake disc of the brake stack such that the ram is not causing compression of the brake stack.

SUMMARY

In various embodiments, a brake actuator system may comprise a brake actuator comprising a ball screw, a ball nut coupled to the ball screw, and a ram coupled to a ram end of the ball nut; a position sensor coupled to the brake actuator; a processor in electronic communication with the brake actuator and the position sensor; and/or a tangible, non-transitory memory configured to communicate with the processor, the tangible, non-transitory memory having instructions stored thereon that, in response to execution by the processor, cause the processor to perform operations. The operations may comprise commanding the brake actuator to translate the ball nut in a first direction toward a brake stack; detecting the pusher reaching a furthest forward position; and/or commanding the brake actuator to translate the ball nut in a second direction opposite the first direction for a predetermined retraction distance. In various embodiments, the furthest forward position is dictated by a maximum current applied to the brake actuator, wherein the maximum current allows the brake actuator to translate the ball nut in the first direction to the furthest forward position.

In various embodiments, the operations may further comprise determining, by the processor, a zero torque position of the ram in response to translating the ball nut for the predetermined retraction distance, wherein the zero torque position is positioned the predetermined retraction distance away in the second direction from the furthest forward position. In various embodiments, the detecting the ram reaching a furthest forward position may comprise detecting, by the processor, the brake actuator stalling in response to the brake actuator receiving insufficient current to translate the ball nut further in the first direction. In various embodiments, the predetermined retraction distance may be measured by the position sensor. In various embodiments, the brake actuator system may further comprise a position detection system by which the brake actuator system determines the zero torque position, wherein the operations further comprise detecting, by the processor, that the position detection system is malfunctioning before the commanding the translation of the ball nut in the first direction.

In various embodiments, the position sensor may be a resolver. In various embodiments, the operations may further comprise receiving, by the processor, a signal from the resolver comprising distance information; and/or determining, by the processor, a distance that the ball nut translated in the first direction from an initial position to reach the furthest forward position. In various embodiments, the position sensor may be at least one of a linear variable differential transformer or a linear encoder.

In various embodiments, a method may comprise applying a current to a brake actuator; commanding, by a processor, the brake actuator to translate a ball nut comprised in the brake actuator in a first direction toward a brake stack; detecting, by the processor, a ram coupled to a ram end of the ball nut reaching a furthest forward position; and/or commanding, by the processor, the brake actuator to translate the ball nut in a second direction opposite the first direction for a predetermined retraction distance. In various embodiments, the method may further comprise determining, by the processor, a zero torque position of the ball nut in response to translating the ball nut for the predetermined retraction distance. The zero torque position may be positioned the predetermined retraction distance away in the second direction from the furthest forward position. In various embodiments, the detecting the ram reaching a furthest forward position may comprise detecting, by the processor, the brake actuator stalling in response to the brake actuator receiving insufficient current to translate the ball nut further in the first direction. In various embodiments, the method may further comprise detecting, by the processor, that a primary position detection system is malfunctioning before translating the ball nut in the first direction. In various embodiments, the method may further comprise receiving, by the processor, a signal from a position sensor comprising distance information; and/or determining, by the processor, a distance that ball nut translated in the first direction from an initial position to reach the furthest forward position.

In various embodiments, the position sensor may be a resolver. In various embodiments, the position sensor may be at least one of a linear variable differential transformer or a linear encoder. In various embodiments, the applying a current to the brake actuator may comprise applying a maximum current to the brake actuator, wherein furthest forward position may be dictated by the maximum current, wherein the maximum current allows the brake actuator to translate the ball nut in the first direction to the furthest forward position.

In various embodiments, an aircraft may comprise a brake actuator system. The brake actuator system may comprise a brake actuator comprising a ball screw, a ball nut coupled to the ball screw, and a ram coupled to a ram end of the ball nut; a position sensor coupled to the brake actuator; a processor in electronic communication with the brake actuator and the position sensor; and/or a tangible, non-transitory memory configured to communicate with the processor, the tangible, non-transitory memory having instructions stored thereon that, in response to execution by the processor, cause the processor to perform operations. The operations may comprise commanding the brake actuator to translate the ball nut in a first direction toward a brake stack; detecting the pusher reaching a furthest forward position; and/or commanding the brake actuator to translate the ball nut in a second direction opposite the first direction for a predetermined retraction distance.

In various embodiments, the operations may further comprise determining, by the processor, a zero torque position of the ram in response to translating the ball nut for the predetermined retraction distance, wherein the zero torque position may be positioned the predetermined retraction distance away in the second direction from the furthest forward position. In various embodiments, the detecting the ram reaching a furthest forward position may comprise detecting, by the processor, the brake actuator stalling in response to the brake actuator receiving insufficient current to translate the ball nut further in the first direction.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

FIG. 2 illustrates a block diagram view of a brake actuator system, in accordance with various embodiments;

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

In the context of the present disclosure, systems and methods may find particular use in connection with aircraft brake systems. However, various aspects of the disclosed embodiments may be adapted for optimized performance with a variety of brake systems, including automobile brake systems and various other motor vehicle brake systems. As such, numerous applications of the present disclosure may be realized.

Figure 1:
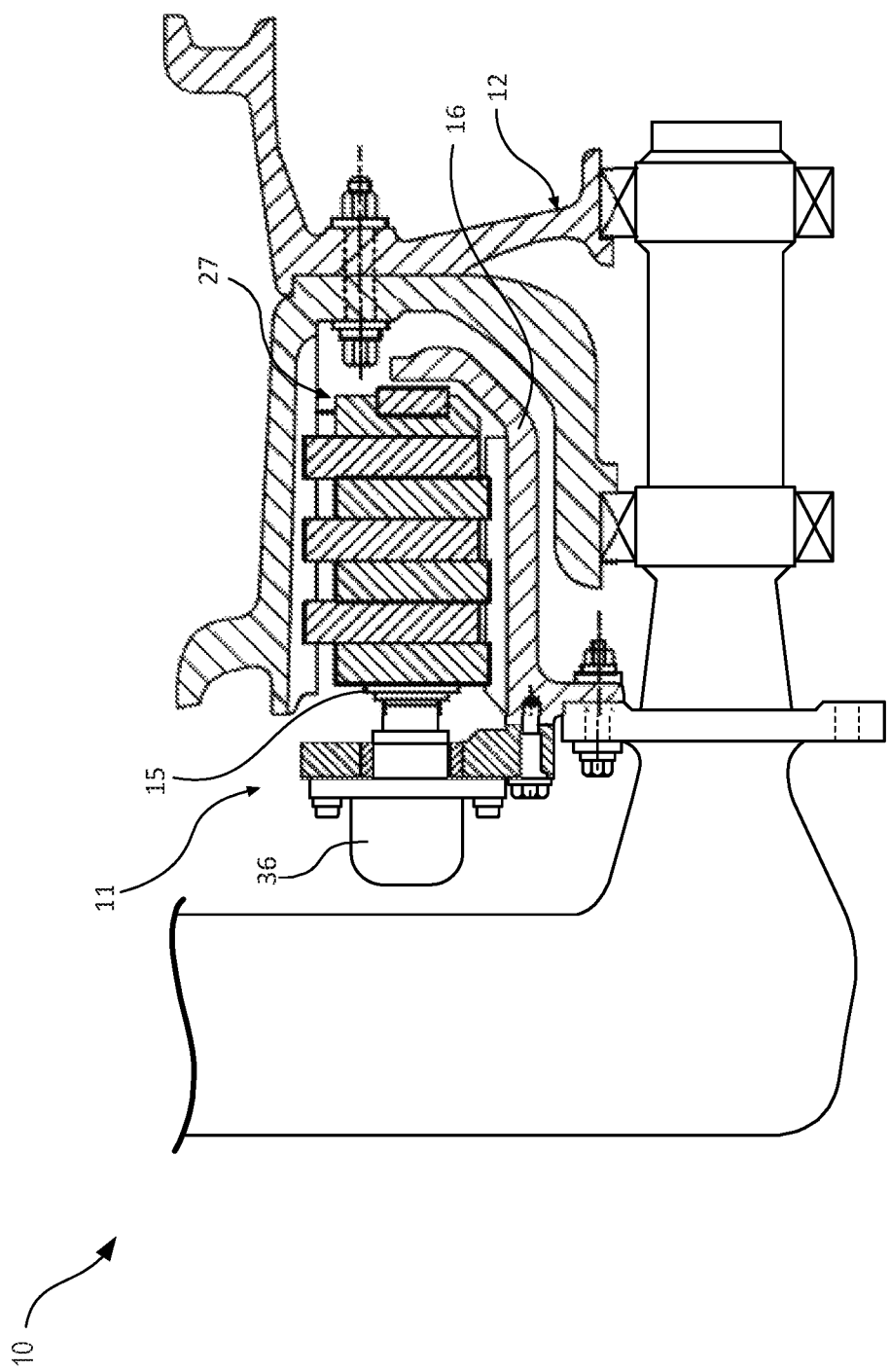
FIG. 1 illustrates a cross section view of a portion of a wheel and brake assembly, in accordance with various embodiments.

With reference to FIG. 1, a portion of a wheel and brake system 10 is illustrated, in accordance with various embodiments. Wheel and brake system 10 may comprise, for example, a brake assembly 11. In various embodiments, brake assembly 11 may be coupled to an axle of a wheel 12. Brake assembly 11 may comprise brake stack 27 comprising rotors and stators that are compressed together by a brake actuator 36 to reduce the speed of a vehicle. In various embodiments, brake stack 27 may comprise components that interface with the rotors, stators, and/or with the wheel axle through torque tube 16.

Brake assembly 11 may further comprise, for example, one or more brake actuators 36, which may be electromechanical. Brake actuators 36 may be configured such that in response to a command signal from a processor (e.g., in response to an operator depressing a brake pedal), brake actuators 36 laterally compress brake stack 27 which, in turn, resists rotation of wheel 12, thereby reducing the speed of the vehicle. Brake actuator 36 may comprise, be coupled to, or otherwise operate a ball screw and a pressure generating device, such as, for example, a ram 15. In response to a command signal (e.g., from a processor), a current may be applied to brake actuator 36 causing the ball screw to rotate. Rotational motion of the ball screw may be transformed into linear motion by a ball nut. The ball nut may comprise a ram end to which ram 15 is coupled. Linear translation of the ball nut may cause ram 15 to apply lateral compression force on brake stack 27.

With reference to FIG. 2, a block diagram of a brake actuator system 200 is illustrated, in accordance with various embodiments. Brake actuator system 200 may comprise a brake actuator 210 coupled to a position sensor 220. In various embodiments, position sensor 220 may be a rotation sensor (e.g., a resolver). In various embodiments, position sensor 220 may be coupled to brake actuator 210 and configured to detect a signal from which the number of rotations of the ball screw and/or the distance translated by the ball nut may be calculated.

In various embodiments, brake actuator system 200 may comprise a processor 224. Processor 224 may be coupled to and/or in electronic communication with position sensor 220. In various embodiments, processor 224 may be comprised in position sensor 220. Processor 224 may be configured to operate as a data acquisition and digital signal processing system. For example, processor 224 may receive data acquired by position sensor 220. Such data may be processed, stored, and/or analyzed by processor 224. In various embodiments, processor 224 may comprise an analog to digital converter, which may be configured to receive analog data acquired by position sensor 220 and convert it to digital data for processing by processor 224.

In various embodiments, brake actuator system 200 may further comprise an actuator controller 230 (e.g., an brake actuator controller ("EBAC")). Actuator controller 230 may be coupled to and/or in electronic communication with processor 224, brake actuator 210, and/or position sensor 220. In various embodiments, actuator controller 230 may comprise processor 224. After digital signal processing, actuator controller 230 may receive data from processor 224, which may comprise position information and/or commands for actuator controller 230 to execute.

In various embodiments, processor 224 may be capable of bidirectional communication with actuator controller 230. Bidirectional communication between processor 224 and actuator controller 230 may, for example, allow for built-in testing to evaluate the health of actuator controller 230, various sensors, and/or brake actuator 210, and/or to detect and correct error conditions, among other functions.

Figure 3A:
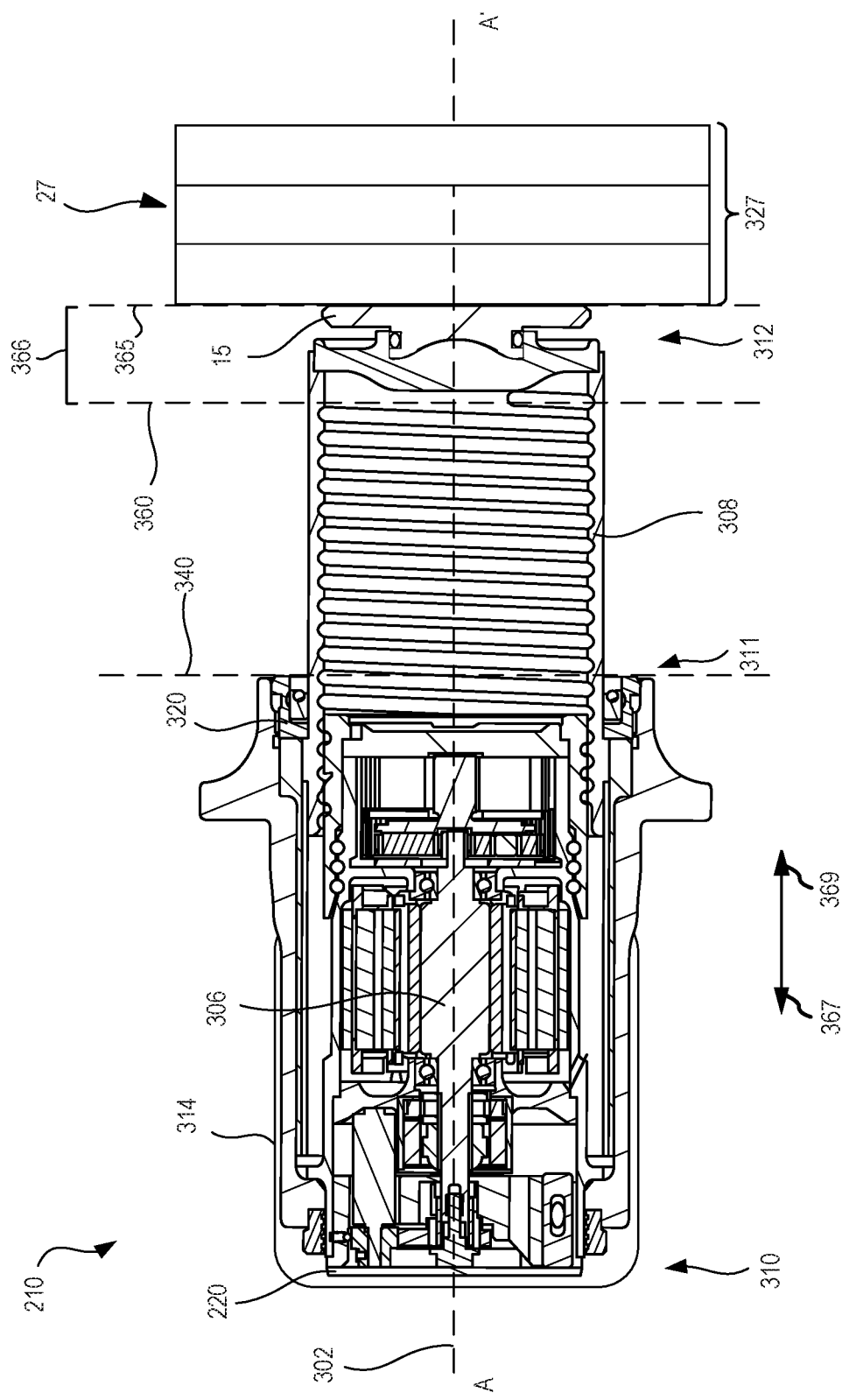
FIG. 3A illustrates a cross section view of a portion of a brake actuator with the brake actuator in the furthest forward position, in accordance with various embodiments.
Figure 3B:
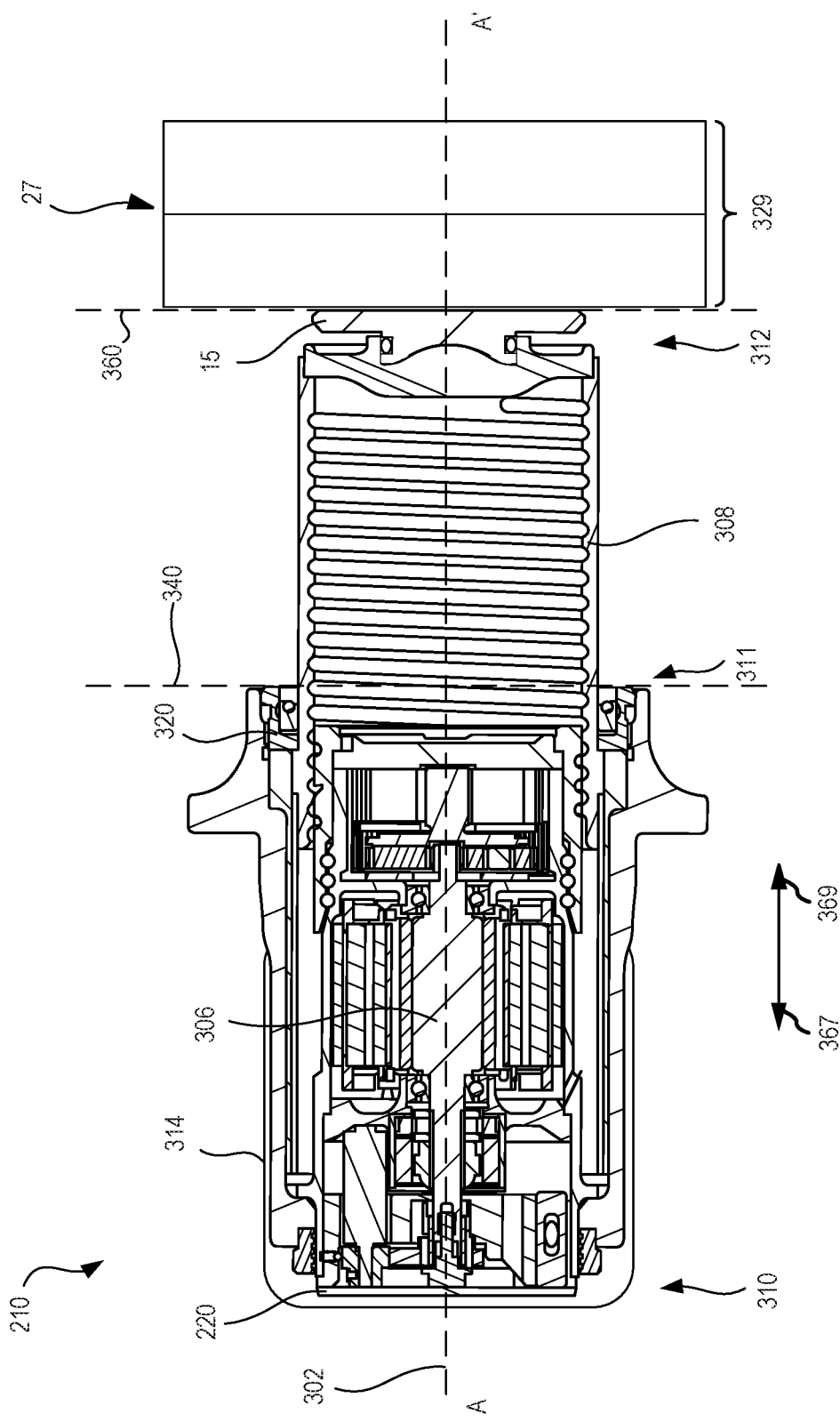
FIG. 3B illustrates a cross section view of a portion of a brake actuator with the brake actuator in the zero torque position, in accordance with various embodiments.

With reference to FIGS. 1, 3A, and 3B, a brake actuator 210 (an example of brake actuator 36 depicted in FIG. 1) is illustrated, in accordance with various embodiments. In various embodiments, brake actuator 210 may comprise a first end 310, a second end 311, a position sensor 220, a brake actuator housing 314, and an actuator seal 320. Actuator seal 320 may comprise an annular ring disposed at the second end 311 of brake actuator 210 and configured to at least partially surround a ball nut 308. Actuator seal 320 may be configured to prevent and/or minimize infiltration of water, dirt, debris, contaminants, and/or the like into brake actuator housing 314. In various embodiments, brake actuator 210 may further comprise a ball screw 306 oriented about axis of rotation 302, which extends in a linear direction from A to A'. Rotational motion of ball screw 306 is transformed into linear motion of ball nut 308 along axis of rotation 302. Linear translation of ball nut 308 translates ram 15 in a linear direction along axis of rotation 302 in and out of brake actuator housing 314 at second end 311 of brake actuator 210. In various embodiments, ram 15 may be disposed on and/or coupled to a ram end 312 of ball nut 308.

In various embodiments, position sensor 220 may be disposed on the first end 310 of brake actuator 210. In various embodiments, at least a portion of position sensor 220 may be disposed between brake actuator housing 314 and ball screw 306. In various embodiments, at least a portion of position sensor 220 may be disposed in brake actuator 210, such that position sensor 220 is at least partially enclosed by brake actuator housing 314. In various embodiments, at least a portion of position sensor 220 may be disposed on brake actuator 210, such that position sensor 220 is coupled to an exterior surface of brake actuator 210, a housing thereof, and/or a component thereof. In various embodiments, position sensor 220 may be coupled to and/or disposed on brake actuator 210 in any suitable manner.

In various embodiments, brake actuator 210 may be in a fully retracted state, wherein ram 15 has been translated as far as possible in a direction 367, or substantially as far as possible, in a linear direction towards A along axis of rotation 302. The location of ram 15 when brake actuator 210 is in a fully retracted state may be referred to herein as the fully retracted position 340. As used herein, a position of ram 15 should be understood to be a location of ram 15 along axis of rotation 302 relative to a fully retracted position 340. As used herein, translation of ram 15 in direction 369 towards A' may be referred to as forward and/or positive translation, movement, and/or position; translation of ram 15 in direction 367 towards A may be referred to as backward and/or negative translation, movement, and/or position. Stated differently, a first position of ram 15 axially closer to A' than a second position of ram 15 is to A' may be described herein as exceeding the second position of ram 15; a second position of ram 15 axially closer to A than a first position of ram 15 is to A may be described herein as being less than the first position of ram 15. FIGS. 3A and 3B illustrate brake actuator 210 in extended states, wherein ram 15 has been translated in direction 369 and the position of ram 15 exceeds fully retracted position 340.

In various embodiments, a brake actuator system comprising brake actuator 210 may be configured to determine a zero torque position 360 of brake actuator 210 and ram 15. In various embodiments, the zero torque position 360 may comprise a position of ram 15, wherein the ram 15 is not in contact or is in minimal contact with brake stack 27 and exerts no lateral compression force thereon. In other words, zero torque position 360 is the maximum position in direction 369 which ram 15 may be disposed that does not exert compression force on brake stack 27. Therefore, in response to ram 15 being in zero torque position 360, brake stack 27 may be in a relaxed position 329, having no lateral compression force between the discs of brake stack 27.

Positioning ram 15 in zero torque position 360 (e.g., while brake actuator 210 is not in operation) may minimize delay in actuation of a brake system comprising brake actuator 210. For example, with combined reference to FIGS. 1-3A, in response to the operator of a vehicle pressing a brake pedal (or otherwise commanding actuation of a brake system), brake actuator 210 of the vehicle's brake system may translate ball nut 308 and ram 15 in direction 369 to compress brake stack 27 and slow the vehicle. However, if there is a gap between the position of ram 15 and brake stack 27 before actuation of brake actuator 210, upon brake system actuation, there may be a delay in ram 15 reaching and compressing brake stack 27, which may pose a safety risk to the vehicle and vehicle operator. Therefore, ram 15 being in zero torque position 360 may cause little or no delay between brake system actuation and brake stack 27 compression because slight movement of ram 15 in direction 369 will cause compression of brake stack 27 and slowing of the vehicle.

In various embodiments, processor 224 may be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101. In various embodiments, the processor may be configured to implement smart algorithms to calculate and/or determine a zero torque position 360 of ram 15, discussed herein.

Figure 4:
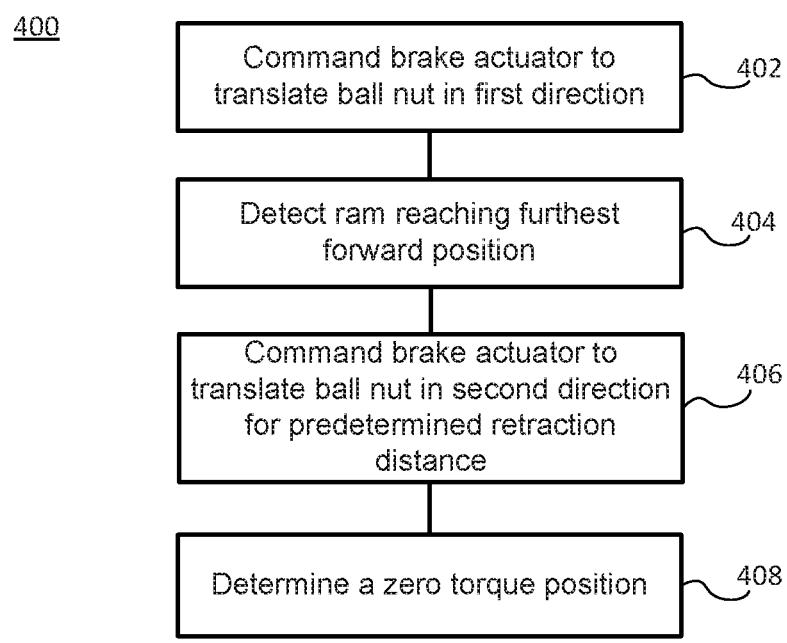
FIG. 4 illustrates a method for determining a zero torque position of a brake actuator system, in accordance with various embodiments.

FIG. 4 depicts a method 400 for determining zero torque position 360 of brake actuator 210, in accordance with various embodiments. Brake actuator 210 may begin method 400 with ram 15 in any position (i.e., an initial position) between fully retracted position 340 and a furthest forward position 365 (defined below). In various embodiments, with combined reference to FIGS. 3A, 3B, and 4, processor 224 may command brake actuator 210 to translate ball nut 308 (step 402) in direction 369 toward brake stack 27. In various embodiments, the commands from processor 224 may be executed by actuator controller 230 (discussed in relation to FIG. 2). To actuate brake actuator 210 to perform method 400, a current may be applied to brake actuator 210. The current applied may be a maximum current applied to brake actuator 210, such that brake actuator 210 may only apply a maximum pressure amount on brake stack 27 that is proportional to the maximum current (i.e., the greater the maximum current, the greater the maximum pressure). The maximum current may be any suitable amount of current to allow any suitable maximum pressure. In response to a current being applied to brake actuator 210, the motor may spin ball screw 306, translating ball nut 308 in direction 369.

Ball nut 308 may translate in direction 369, and ram 15 on ram end 312 of ball nut 308 may contact brake stack 27. Ball nut 308 and ram 15 may continue to translate in direction 369, compressing brake stack 27. In response to the maximum pressure applied by ram 15 against brake stack 27 being achieved, the motor of brake actuator 210 may stall. The motor may stall because the maximum current applied to brake actuator 210 may only allow the maximum pressure to be applied by ram 15 against brake stack 27. Therefore, for ram 15 to apply more pressure than is allowed by the maximum current (i.e., pressure greater than the maximum pressure), additional current would have to be applied to brake actuator 210. The position of ram 15 at the point in direction 369 at which the maximum pressure is applied to brake stack 27 (i.e., brake stack 27 may not be compressed further in direction 369) is a furthest forward position 365 of ram 15 and brake actuator 210. Furthest forward position 365 may be the point at which the maximum pressure applied in direction 369 by ram 15 equals the pressure applied by spring force in brake stack 27 in direction 367. Therefore, the brake discs in brake stack 27 may be in a compressed position 327 in response to ram 15 being in furthest forward position 365. Processor 224 may detect ram 15 reaching furthest forward position 365 (step 404). In various embodiments, processor 224 may detect ram 15 reaching furthest forward position 365 by detecting the motor of brake actuator 210 stalling.

In various embodiments, in response to ram 15 reaching furthest forward position 365 and processor 224 detecting the same, position sensor 220 may detect the distance ram 15 and/or ball nut 308 translated from an initial position to furthest forward position 365. As discussed above, position sensor 220 may be a resolver, wherein the resolver may provide position data related to the number of rotations ball screw 306 made for ram 15 to reach furthest forward position 365 from the initial position of ram 15. Processor 224 may receive the information from position sensor 220 (e.g., the resolver), and calculate and/or determine the distance translated by ball nut 308 and/or ram 15. In various embodiments, position sensor 220 may be a linear variable differential transformer (LVDT) and/or a linear encoder, wherein position sensor 220 would detect the absolute positions of the initial position and furthest forward position 365 of ram 15. In response, processor 224 may receive the position information from position sensor 220 and calculate the distance between the initial position and furthest forward position 365 of ram 15.

In response to processor 224 detecting ram 15 reaching furthest forward position 365, processor 224 may command brake actuator 210 to translate ball nut 308 in direction 367 for a predetermined retraction distance 366 (step 406). Predetermined retraction distance 366 may be the distance between furthest forward position 365 and zero torque position 360. Predetermined retraction distance 366 may be determined based on the spring coefficient (e.g., pounds per inch ($kg/cm^2$) of displacement) of brake stack 27. For example, if the spring coefficient of brake stack 27 is low (i.e., a loose spring force), predetermined retraction distance 366 may be greater than if brake stack 27 has a high spring coefficient (i.e., a stiff spring force). In other words, brake stack 27 having a low spring coefficient results in brake stack 27 compressing more under the maximum pressure, and having a furthest forward position 365 more forward, than brake stack 27 having a high spring coefficient. Accordingly, predetermined retraction distance 366 is based on the spring coefficient of brake stack 27.

In response to processor 224 commanding brake actuator 210 to translate ball nut 308 and ram 15 in direction 367 after reaching furthest forward position 365, brake actuator 210 may translate ball nut 308 and ram 15 in direction 367 for predetermined retraction distance 366. Position sensor 220 may monitor ram 15 and/or ball nut 308 position while brake actuator 210 translates ram 15 and ball nut 308 for the predetermined retraction distance 366. Processor 224, by receiving position information from position sensor 220, may detect the completion of predetermined retraction distance 366 being translated by ram 15 and ball nut 308. In response, in various embodiments, processor 224 may determine zero torque position 360 (step 408) as the position of ram 15 and/or ball nut 308 after having translated predetermined retraction distance 366 (i.e., zero torque position 360 may be the position of ram 15 disposed the predetermined retraction distance 366 in direction 367 away from furthest forward position 365). Processor 224 may store the determined zero torque position 360. Processor 224 may command that ram 15 be positioned at zero torque position 360 when brake actuator 210 is not in operation.

In various embodiments, a brake system may comprise alternative systems and/or methods for determining zero torque position 360, such as by using a load cell to receive force feedback to determine the point at which there is no force on the ram from the brake stack, and vice versa. In the event that alternative systems for determining zero torque position 360 malfunction (e.g., a position detection system), processor 224 may detect that such systems are malfunctioning, and in response, utilize method 400 and brake actuator 210 to determine zero torque position 360. In various embodiments, brake actuator system 200 (FIG. 2), comprising brake actuator 210, and method 400 may be implemented as the primary method to determine zero torque position 360. Furthermore, systems and methods discussed herein may be utilized periodically throughout the life of a brake system and its brake discs to account for any changes in the zero torque position resulting from brake disc wear.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake actuator system, comprising:
   a brake actuator comprising a ball screw, a ball nut coupled to the ball screw, and a ram coupled to a ram end of the ball nut;
   a position sensor coupled to the brake actuator configured to detect the number of rotations of the ball screw in response to translating the ball nut in a linear direction;
   a position detection system by which the brake actuator system determines a zero torque position of at least one of the ram and the ball nut;
   a processor in electronic communication with the brake actuator and the position sensor; and
   a tangible, non-transitory memory configured to communicate with the processor, the tangible, non-transitory memory having instructions stored thereon that, in response to execution by the processor, cause the processor to perform operations, separate from the position detection system, comprising:
   detecting, by the processor, a malfunction of the position detection system, and in response to the detecting the malfunction, utilizing the brake actuator and the tangible, non-transitory memory to determine the zero torque position rather than the position detection system;
   beginning with the ram in any initial position relative to a brake stack, commanding, by the processor, the brake actuator to translate the ball nut in a first direction toward a brake stack;
   commanding, by the processor, provision of a current to the brake actuator, the current being associated with a known maximum force able to be applied by the ram to compress the brake stack and a known compression amount of the brake stack;
   detecting, by the processor, the ram reaching a furthest forward position; and
   commanding, by the processor, the brake actuator to translate the ball nut in a second direction opposite the first direction for a predetermined retraction distance associated with the zero torque position in response to the detecting the ram reaching the furthest forward position, such that, in response, the ram will be disposed at the zero torque position relative to the brake stack, wherein the zero torque position is positioned the predetermined retraction distance away in the second direction from the furthest forward position.

2. The brake actuator system of claim 1, wherein the operations further comprise determining, by the processor, the zero torque position of the ram in response to translating the ball nut for the predetermined retraction distance.

3. The brake actuator system of claim 1, wherein the detecting the ram reaching the furthest forward position comprises detecting, by the processor, the brake actuator stalling in response to the brake actuator receiving insufficient current to translate the ball nut further in the first direction.

4. The brake actuator system of claim 1, wherein the predetermined retraction distance is measured by the position sensor.

5. The brake actuator system of claim 1, wherein the position sensor is a resolver.

6. The brake actuator system of claim 5, wherein the operations further comprise receiving, by the processor, a signal from the resolver comprising distance information; and determining, by the processor, a distance that the ball nut translated in the first direction from an initial position to reach the furthest forward position.

7. The brake actuator system of claim 1, wherein the position sensor is at least one of a linear variable differential transformer or a linear encoder.

8. The brake actuator system of claim 1, wherein the furthest forward position is dictated by a maximum current applied to the brake actuator, wherein the maximum current allows the brake actuator to translate the ball nut in the first direction to the furthest forward position.

9. An aircraft, comprising:
   a brake actuator system, comprising:
      a brake actuator comprising a ball screw, a ball nut coupled to the ball screw, and a ram coupled to a ram end of the ball nut;
      a position sensor coupled to the brake actuator configured to detect the number of rotations of the ball screw in response to translating the ball nut in a linear direction;
      a position detection system by which the brake actuator system determines a zero torque position of at least one of the ram and the ball nut;
      a processor in electronic communication with the brake actuator and the position sensor; and
      a tangible, non-transitory memory configured to communicate with the processor, the tangible, non-transitory memory having instructions stored thereon that, in response to execution by the processor, cause the processor to perform operations, separate from the position detection system, comprising:
      detecting, by the processor, a malfunction of the position detection system, and in response to the detecting the malfunction, utilizing the brake actuator and the tangible, non-transitory memory to determine the zero torque position rather than the position detection system;
      beginning with the ram in any initial position relative to a brake stack, commanding, by the processor, the brake actuator to translate the ball nut in a first direction toward a brake stack;
      commanding, by the processor, provision of a current to the brake actuator, the current being associated with a known maximum force able to be applied by the ram to compress the brake stack and a known compression amount of the brake stack;

detecting, by the processor, the ram reaching a furthest forward position; and commanding, by the processor, the brake actuator to translate the ball nut in a second direction opposite the first direction for a predetermined retraction distance associated with the zero torque position in response to the detecting the ram reaching the furthest forward position, such that, in response, the ram will be disposed at the zero torque position relative to the brake stack, wherein the zero torque position is positioned the predetermined retraction distance away in the second direction from the furthest forward position.

10. The aircraft of claim 9, wherein the operations further comprise determining, by the processor, the zero torque position of the ram in response to translating the ball nut for the predetermined retraction distance.

11. The aircraft of claim 9, wherein the detecting the ram reaching the furthest forward position comprises detecting, by the processor, the brake actuator stalling in response to the brake actuator receiving insufficient current to translate the ball nut further in the first direction.

* * * * *